UNITED STATES PATENT OFFICE.

WILLIAM MURRAY GOODWIN AND ARTHUR FORDYCE GRANT CADENHEAD, OF KINGSTON, ONTARIO, CANADA, ASSIGNORS TO WILLIAM LAWTON GOODWIN, OF KINGSTON, CANADA, AND WILLIAM PHILIP FIRTH, OF TORONTO, CANADA.

PROCESS FOR RECOVERING VANADIUM FROM CERTAIN IRON ORES.

1,359,473.

Specification of Letters Patent. Patented Nov. 16, 1920.

No Drawing. Application filed April 4, 1919. Serial No. 287,513.

*To all whom it may concern:*

Be it known that we, WILLIAM MURRAY GOODWIN and ARTHUR FORDYCE GRANT CADENHEAD, both subjects of the King of Great Britain, and residents of Queens University, in the city of Kingston, county of Frontenac, Province of Ontario, in the Dominion of Canada, have invented certain new and useful Improvements in Processes for Recovering Vanadium from Certain Iron Ores, of which the following is a specification.

The invention relates to a process for recovering vanadium from certain iron ores, and the object of the invention is to reduce the cost and increase the production of vanadium so as to facilitate its use in steel manufacture and manufactures, and it consists essentially of the novel steps employed hereinafter set forth in detail and particularly pointed out in the claims.

The process is carried out by first melting the ore in an electric, blast or other suitable furnace with carbon in suitable form as reducing agent or other suitable reducing agent, and with suitable flux such as silica in the form of sand or siliceous iron ore which will cause the vanadium to go into the resulting pig iron rather than into the resulting slag.

The result is to carry all the vanadium or in any case a maximum quantity into the pig iron product.

If it is desirable to increase the percentage of vanadium in the pig iron the pig iron containing the vanadium is then placed in another furnace, which may be open hearth, electric, or another, and there decarburized by the addition of a suitable oxid such as mill scale or iron ore and this throws all or nearly all the vanadium into the resulting slag.

This vanadiferous slag is then mixed with fresh ore and is deposited in the first electric or other furnace, where the vanadium in the fresh ore joins the vanadium from the first lot which is again reduced by the additional smelting, and both first and second lots of vanadium together go into the pig iron.

It might be advisable in carrying out this step to have a third furnace, and join the first production of slag containing the vanadium with the fresh ore in this third furnace, and confine the addition of fresh ore to a comparatively small charge.

If it be necessary to raise to a still higher percentage the vanadium in the pig-iron, this second lot of pig-iron is decarburized in the open hearth or other furnace as above, and the resulting slag, still more highly vanadiferous, again treated in the way indicated. And this process can be repeated as many times as is necessary to raise the vanadium in the pig-iron to the percentage required.

To make the alloy steel, we add to the decarburized metal obtained as above or to a similar decarburized bath of iron obtained in the ordinary manufacture of steel, sufficient of the highly vanadiferous pig-iron obtained as above, to give the desired content of carbon vanadium and other alloying elements in the resulting steel.

If the proportion of one or more of the alloying elements in the natural ore is too low for our purpose, then we add as a mixture with the ore in the first smelting furnace, or in the furnace that produces the recarburizing material, sufficient ore containing this element to make up the deficiency. Thus, if there is insufficient chromium in the natural iron ore, we mix enough chromite with it, to give in the resulting pig-iron or recarburizing material, the proportion of chromium we desire.

In this cycle of operations, easily oxidized metals such as manganese and chromium, follow or go with the vanadium and are recovered in the same way. Less easily oxidized metals such as nickel and cobalt, remain in the iron or mild steel on decarburizing and are recovered at that stage in the process.

As an alternative to the above cycle of operations for producing vanadium alloy steel, we take the vanadiferous pig-iron resulting from the first smelting referred to above and either alone or diluted with a sufficient quantity of scrap-iron or steel or other iron or steel produced by ordinary process, decarburize and refine the bath of metal first under oxidizing and then under reducing conditions in a suitable furnace, preferably an electric furnace, with the result that the vanadium and other alloying elements which are oxidized and enter the slag at first are reduced and again enter the bath of metal when the conditions are changed to reducing. This method of finally retaining the alloying metals in the steel produced is in common use, and though we may employ it, we do not claim it as part of our invention, our invention consisting essentially of the recovery of vanadium occurring in iron or along with the iron with which it occurs in nature, either in the form of vanadiferous pig-iron or ferro-vanadium, as an intermediate product, or as vanadium alloy steel, the final product.

What I claim is:

1. A process for recovering vanadium and other valuable alloying metals from certain iron ores, consisting in smelting a quantity of the ore with carbon and with suitable flux, for example silica, to produce a pig-iron containing the maximum of vanadium originally contained in the ore.

2. A process for recovering vanadium and other valuable alloying metals from certain iron ores, consisting in smelting a quantity of the ore with suitable reducing agent together with silica to produce pig iron containing the maximum of vanadium originally contained in the ore.

3. A process for recovering vanadium from certain iron ores, consisting in furnacing a quantity of ore and producing pig iron thereby, decarburizing said pig iron, refurnacing the slag thus producing on decarburizing in the presence of fresh ore, adding sufficient chrome ore to give in the resulting pig iron the desired proportion of chromium and finally recarburizing the decarburized iron or similar decarburized iron by the addition of a certain percentage of the refurnaced product of said slag.

4. A process for recovering vanadium from certain iron ores containing vanadium (such as titaniferous magnetites containing vanadium, consisting in reducing said ores, by furnacing to a pig iron containing the vanadium, decarburizing said pig iron and thereby separating the vanadium and certain other alloying elements from the iron and producing a slag with a comparatively high percentage of these alloying elements and at the same time of iron or mild steel that may contain certain other of the alloying elements, and refurnacing said slag with fresh ore to remove said alloying elements and concentrate same in the resulting pig iron together with the alloying elements of said fresh ore, and continuing this cycle of operations the number of times necessary to give required proportions of alloying metals, particularly vanadium, in the last resulting pig-iron, up to and including alloys such as ferro-vanadium.

5. A process for recovering vanadium from mixtures of iron ores containing vanadium with material providing the necessary alloying elements, such as chromite, consisting in reducing said mixtures by furnacing to a pig iron containing the vanadium, decarburizing said pig iron and thereby separating the vanadium and certain other alloying elements from the iron and producing a slag with a comparatively high percentage of these alloying elements and at the same time of iron or mild steel that may contain certain other of the alloying elements, and refurnacing said slag with fresh ore to remove said alloying elements and concentrate same in the resulting pig iron together with the alloying elements of said fresh ore, and continuing this cycle of operations the number of times necessary to give required proportions of alloying metals, particularly vanadium, in the last resulting pig-iron, up to and including alloys such as ferro-vanadium.

Signed at the city of Kingston, Province of Ontario, this 24th day of March, 1919.

WILLIAM MURRAY GOODWIN.
ARTHUR FORDYCE GRANT CADENHEAD.

Witnesses:
  Wm. P. Firth,
  W. L. Goodwin.